US007475295B2

(12) United States Patent
Purrington et al.

(10) Patent No.: US 7,475,295 B2
(45) Date of Patent: Jan. 6, 2009

(54) INTELLIGENT WATCHDOG CIRCUIT

(75) Inventors: Challis Llewellyn Purrington, Raleigh, NC (US); Christopher Collier West, Raleigh, NC (US); Jack P. Wong, Apex, NC (US); Maya Yarbrough, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 11/193,677

(22) Filed: Oct. 28, 2005

(65) Prior Publication Data
US 2007/0101205 A1 May 3, 2007

(51) Int. Cl.
*G06F 11/00* (2006.01)

(52) U.S. Cl. .............................. 714/55; 714/36; 714/39

(58) Field of Classification Search ................... 714/55
See application file for complete search history.

(56) References Cited

U.S. PATENT DOCUMENTS

| 3,611,097 A | | 10/1971 | Joslyn |
| 3,732,403 A | | 5/1973 | Thorsoe |
| 4,379,338 A | | 4/1983 | Nishitani et al. |
| 4,586,179 A | * | 4/1986 | Sirazi et al. ................... 714/22 |
| 4,627,060 A | * | 12/1986 | Huang et al. ................... 714/36 |
| 4,727,549 A | * | 2/1988 | Tulpule et al. ................ 714/55 |
| 4,809,280 A | * | 2/1989 | Shonaka ....................... 714/55 |
| 4,879,647 A | * | 11/1989 | Yazawa ........................ 714/55 |
| 5,099,153 A | | 3/1992 | Adams |
| 5,572,215 A | | 11/1996 | Evans et al. |
| 5,581,577 A | | 12/1996 | Abe |
| 5,784,627 A | * | 7/1998 | MacDonald ................. 713/300 |
| 5,864,663 A | * | 1/1999 | Stolan ........................... 714/55 |
| 6,385,274 B1 | | 5/2002 | Nohara |
| 6,460,107 B1 | | 10/2002 | Rao et al. |
| 6,487,680 B1 | * | 11/2002 | Skazinski et al. .............. 714/23 |
| 6,959,404 B2 | * | 10/2005 | Hirakawa et al. .............. 714/55 |
| 2005/0188277 A1 | * | 8/2005 | Tayler et al. ................... 714/39 |

FOREIGN PATENT DOCUMENTS

| EP | 0205163 A2 | 11/1989 |
| JP | 6-110737 | 4/1994 |
| JP | 07-200329 | 8/1995 |

* cited by examiner

*Primary Examiner*—Scott T Baderman
*Assistant Examiner*—Kamini Patel
(74) *Attorney, Agent, or Firm*—Cynthia S. Byrd; Dillon & Yudell LLP

(57) ABSTRACT

A simple, but intelligent watchdog circuit uses an up/down counter for its delay element. A watchdog event will occur if the counter is allowed to over flow or under flow its boundaries (in either direction). The system objective is to keep the counter within its boundaries by controlling the direction of the count. The count direction is simply a function of the Most Significant Bit (MSB) of the counter. Thus, the system must simply monitor the counters MSB and perform a little intelligent to determine the desired count direction.

11 Claims, 4 Drawing Sheets

| Decimal Count | MSB.. ..LSB | Counter Region |
|---|---|---|
|  |  |  |
| 255 | 1111 1111 | Upper Half of Counter<br><br>MSB="1"<br>Count Down |
| 254 | 1111 1110 | |
| 253 | 1111 1101 | |
| " | " | |
| " | " | |
| 129 | 1000 0001 | |
| 128 | 1000 0000 | |
| 127 | 0111 1111 | Lower Half of Counter<br><br>MSB="0"<br>Count Up |
| 126 | 0111 1110 | |
| " | " | |
| " | " | |
| 2 | 0000 0010 | |
| 1 | 0000 0001 | |
| 0 | 0000 0000 | |

Columns: 602 (Decimal Count), 604 (MSB..LSB), 606 (Counter Region). 608 = Upper Half; 610 = Lower Half.

*Fig. 6*

INTELLIGENT WATCHDOG CIRCUIT

BACKGROUND OF THE INVENTION

1. Technical Field

The present invention relates generally to microprocessor controlled circuits, and more specifically to watchdog timer circuits. Still more particularly, the present invention relates to an intelligent watchdog timer circuit design.

2. Description of the Related Art

The use of watchdog circuits to monitor the operation of and reset the microprocessors in the event of aberrant operation (e.g., program abnormal execution/termination or an operation within an infinite loop) is well known. The watchdog circuits provided the reset command necessary to ensure that the microprocessor returns to a known reference state after a failure, in order to resume a designated operation.

The watchdog circuit comprises a counter that receives a clock input as a count source and outputs an overflow signal when its count reaches a predetermined number. The overflow signal is supplied into a system reset terminal as a reset signal of the microcomputer. The counter is reset cyclically by the program, and the reset operation of counter by the program is carried out at a time when the count value of the counter does not overflow. Those skilled in the art are familiar with the occurrence of overflow conditions and the resulting reset of the counter and system (e.g., microprocessor) that occurs.

Conventional watchdog circuits are implemented around a delay element. This delay element is occasionally implemented using an RC circuit if the timing requirement is under a second. Typical watchdog circuits are implemented digitally and with precision, using a simple count-up (i.e., incremental) counter for its delay element. With this system configuration, the system must reset the counter before the counter overflows.

FIGS. 1 and 2 illustrate a conventional watchdog timer connected to a host system. As shown in FIG. 1, watchdog circuit 101 is coupled to host system 110 via two signal paths, watchdog overflow signal 108 and restart watchdog signal 106. Watchdog circuit 101 comprises counter 105, which receives a clock input from a known source such as a system clock (not shown).

FIG. 2 illustrates state diagram representations of watchdog circuit 101 and system 110. State diagram of watchdog circuit 101 includes five states, with a transition from states one through five based on inputs received from system 110. State one 202 represents the initial power on state at which the watchdog circuit initializes watchdog counter to zero (block 204). State two 206 represents a decision input of the clock time to the counter. From state two 206, the circuit moves to either state five 208 or to a delay element 212. The delay element 212 represents a single delay loop within/associated with state two 206 until the clock time changes.

At state five 208, the circuit determines whether a toggle signal was received/detected from the system. When a toggle signal is detected, the circuit returns to block 204 at which the watchdog counter is initialized to zero. If no signal is detected, the counter is incremented (block 210) and then the circuit passes to state three 214 at which the circuit determines whether the counter is at an overflow state. When the counter is not at an overflow state, control is returned to state two 206 via delay element 212. When an overflow condition is registered, control passes to state four 216 at which the system is reset. Also, at block 218, the system may either log the occurrence of the fault (overflow) before the watchdog function is reactivated or alternatively the system may decide not to enable the watchdog after the occurrence of the fault.

From the system perspective, only two states are relevant. At state one 220 a determination is made whether the time to toggle the watchdog has arrived. When the time to toggle the watchdog circuit has not arrived, control is returned to state one 220 via delay element 224. When the time to toggle the watchdog circuit has arrived, control passes to state two 222, at which the watchdog signal is pulsed.

A large number of watchdog timers are reset by simple transitions detected from their host system. For example, if a typical five minute watchdog timer sees any transition within the time-out period (i.e., five minutes), the watchdog timer will treat this transition as a valid keep-a-live signal from the host system and the watchdog timer will restart its timers/counter. One drawback to this approach however, is that in some faults, a hung system may produce sufficient random keep-a-live pulses that would keep the watchdog from performing its desired monitoring/signaling task.

Some improvements and other alternative designs of watchdog timers have been proposed. Included among these are:

U.S. Pat. No. 6,385,274 provides a watchdog circuit that prevents unexpected signals being created before the watchdog issues a reset. However, this patent does not prevent false refreshes;

U.S. Pat. No. 5,864,663 provides a watchdog circuit that issues an overflow signal that can be used as a reset signal for the system;

U.S. Pat. No. 5,099,153 describes a watchdog circuit that counts down until a condition is met; and European patent 025163A2 provides a watchdog timer circuit that utilizes a charging/discharging capacitor as its timer instead of a counter with a clock input.

Notably, none of the above methods intelligently addresses the problem of false keep-alive pulses while a system is in a hung state. Again, random keep-a-live signals prevents the above conventional watchdog designs from reliably performing its required task. One approach to implement a more intelligent watchdog circuit requires the use of a small microcontroller, but this approach is expensive, and thus cost prohibitive. The present invention addresses the desirability of having a more intelligent but easier-to-implement solution for watchdog timers.

SUMMARY OF THE INVENTION

Disclosed is an intelligent watchdog circuit and method for providing intelligent watchdog circuit functionality by which the counter is made to count in both an increasing and decreasing direction (i.e., up from zero to the maximum value or down from the maximum value to zero. The enhanced watchdog circuit does not fall victim (i.e., is not susceptible to being tricked) by random signals from a faulty system, as occurs with conventional designs. The reversible, up/down counter is prevented from rolling over by controlling its up-down mode controls. The system being watched monitors the watchdog counter's most significant bit (MSB) to determine the count direction.

The intelligent watchdog design addresses the problem of random keep-a-live signals that prevents the conventional watchdog designs from reliably performing their required task(s). The intelligent watchdog design requires additional intelligence from the system, by requiring the system to control the direction of the counter to prevent a roll-over to occur. The system sets the count direction based on the state of the MSB of the watchdog counter.

The watchdog circuit includes an additional output signal (MSB signal) in addition to the standard output signals provided by conventional circuits. Using this MSB signal (indicating the value of the MSB, 1 or 0), the system triggers the direction in which the watchdog circuit counts. Thus, when the MSB is "1", the system instructs the watchdog to count down, and when the MSB is "0", then, the system instructs the watchdog to count up.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 6 is a block diagram representation of an 8-bit counter indicating the relationship between the direction of the count and the value of the MSB, according to one embodiment of the present invention.

DETAILED DESCRIPTION OF AN ILLUSTRATIVE EMBODIMENT

The present invention provides an intelligent watchdog circuit and method for providing intelligent watchdog circuit functionality by which the counter is made to count in both an increasing and decreasing direction (i.e., up from zero to the maximum value or down from the maximum value to zero. The enhanced watchdog circuit does not fall victim (i.e., is not susceptible to being tricked) by random signals from a faulty system, as occurs with conventional designs. The reversible, up/down counter is prevented from rolling over by controlling its up-down mode controls. The system being watched monitors the watchdog counter's most significant bit (MSB) to determine the count direction.

Thus, the invention introduces a simple, but intelligent watchdog circuit uses an up/down counter for its delay element. A watchdog event occurs if the counter is allowed to over flow or under flow its boundaries (in either direction). The system objective is to keep the counter within its boundaries by controlling the direction of the count. The count direction is simply a function of the most significant bit of the counter. Thus, the system must simply monitor the counter's MSB and perform a little intelligent evaluation to determine the desired count direction.

The intelligent watchdog design addresses the problem of random keep-a-live signals that prevents the conventional watchdog designs from reliably performing their required task(s). The intelligent watchdog design requires additional intelligence from the system, by requiring the system to control the direction of the counter to prevent a roll-over to occur. The system sets the count direction based on the state of the MSB of the watchdog counter.

The watchdog circuit includes an additional output signal (MSB signal) in addition to the standard output signals provided by conventional circuits. Using this MSB signal (indicating the value of the MSB, 1 or 0), the system triggers the direction in which the watchdog circuit counts. Thus, when the MSB is "1", the system instructs the watchdog to count down, and when the MSB is "0", then, the system instructs the watchdog to count up.

Figure 1:
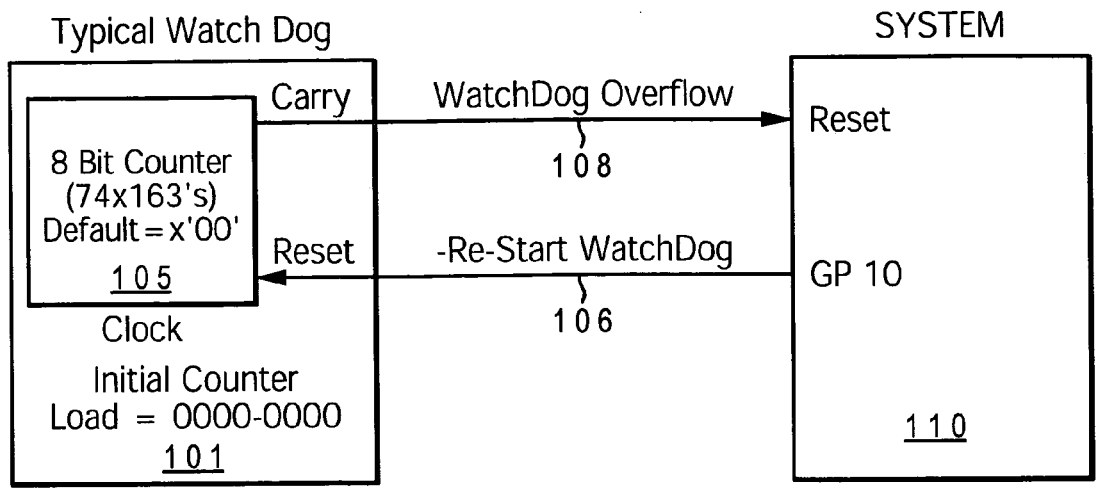
FIG. 1 is a block diagram representation of a prior art watchdog circuit coupled to a system.
Figure 3:
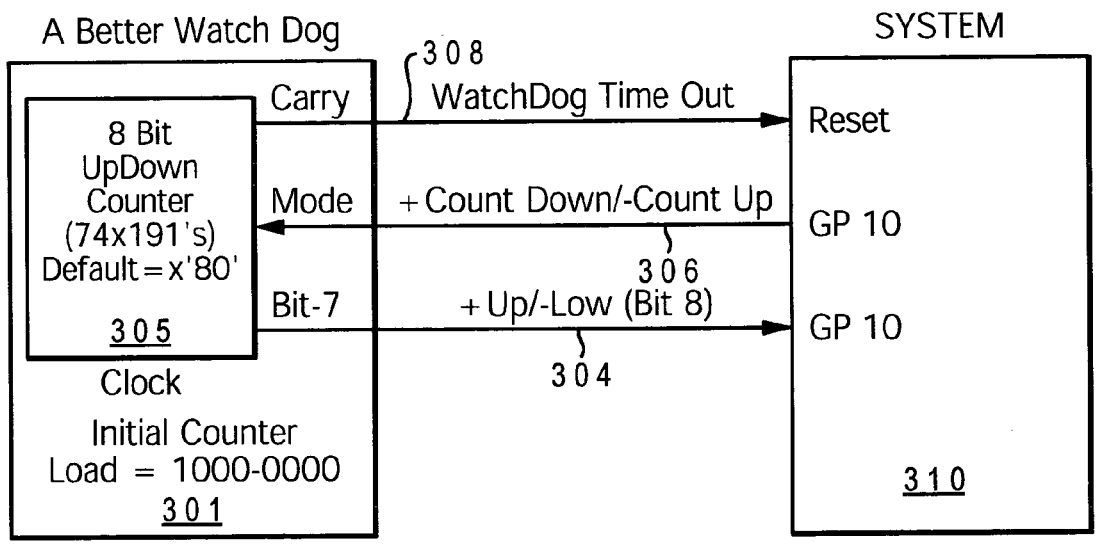
FIG. 3 is a block diagram representation of an intelligent watchdog circuit coupled to a system, according to one embodiment of the present invention.

With reference now to the figures and in particular to FIG. 3, there is illustrated the coupling of an intelligent watchdog circuit to a system, according to one embodiment of the invention. System 310 may be any type of electrical device, such as a microprocessor or other integrated circuit device, but is referred to herein as a general system.

As shown in FIG. 3, watchdog circuit 301 is coupled to host system 310 via two output signal paths and one input signal path. The output signal paths include watchdog timeout signal 308 and MSB signal 304. Input signal is a counter direction signal 306, which triggers the counter to count up or down. MSB signal 304 may be a logic high (1) or logic low (0), representing the value of the most significant bit of the counter.

Figure 5:
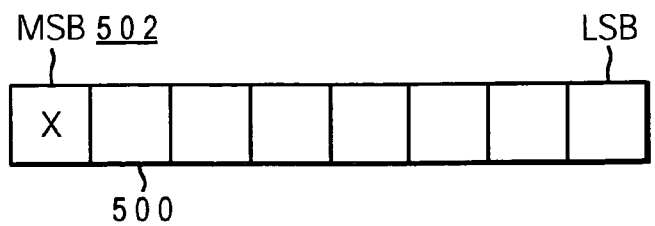
FIG. 5 illustrates the most significant bit (MSB) of a counter utilized within the intelligent watchdog circuit in accordance with the invention.
Figure 2:
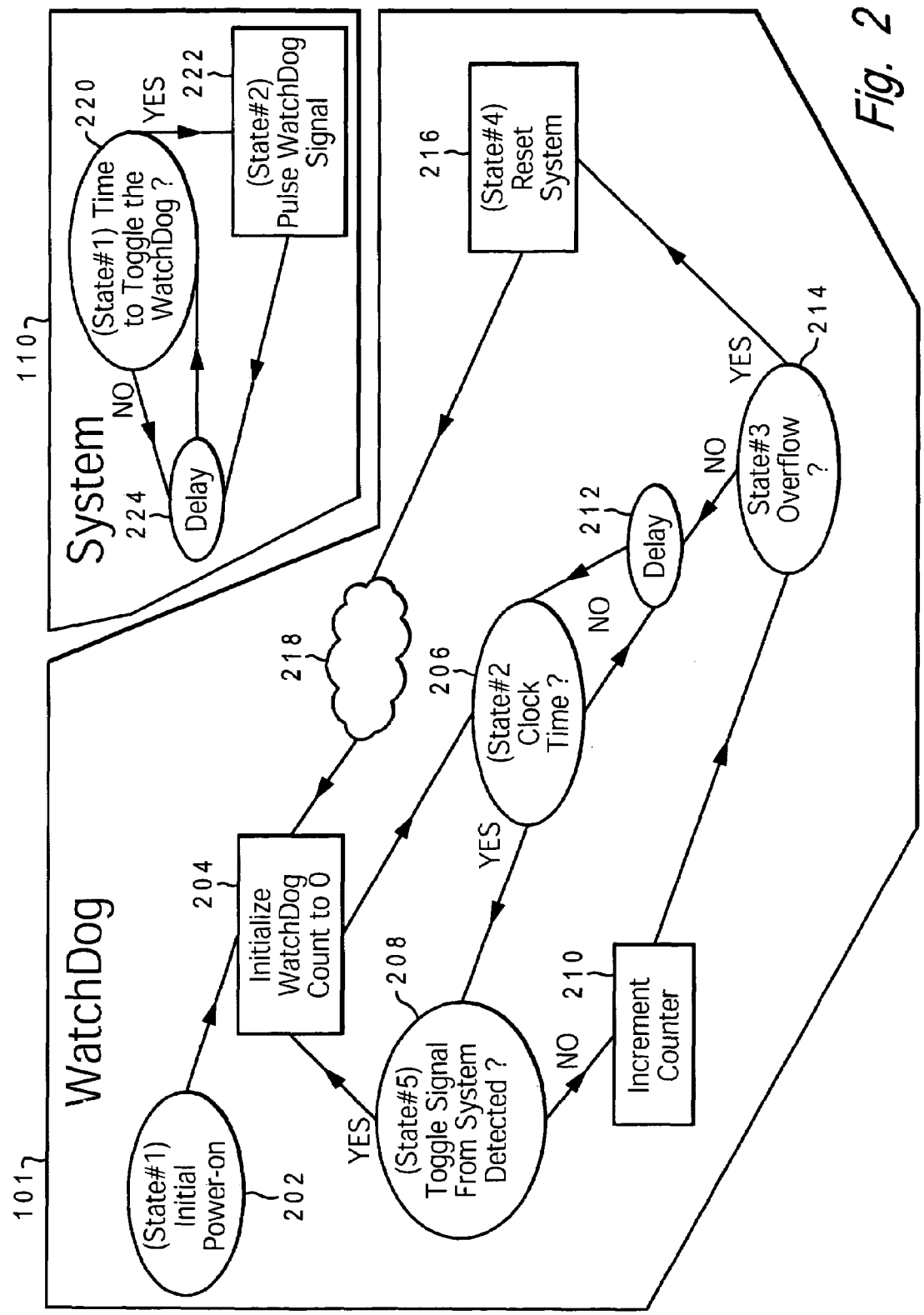
FIG. 2 is a state diagram illustrating the various transition states within the flow of operation of the watchdog circuit and system of FIG. 1, according to the prior art.

Watchdog circuit 301 comprises an N-bit counter 305, which receives a clock input from a known source such as a system clock (not shown). For simplification of the description and illustration, N is assumed to be 8, although it is understood that the invention is applicable to a counter having any number of bits, preferably above 2, that would allow the counter to count up and/or down depending on the value of the most significant bit. FIG. 5 illustrates an exemplary 8-bit counter 500 with most significant bit 502 at one end and a least significant bit at the opposing end. MSB signal 304 is connected to MSB 502 at one end and feeds the value from within the most significant bit (e.g. 0 or 1) into the host system 310.

Figure 4:
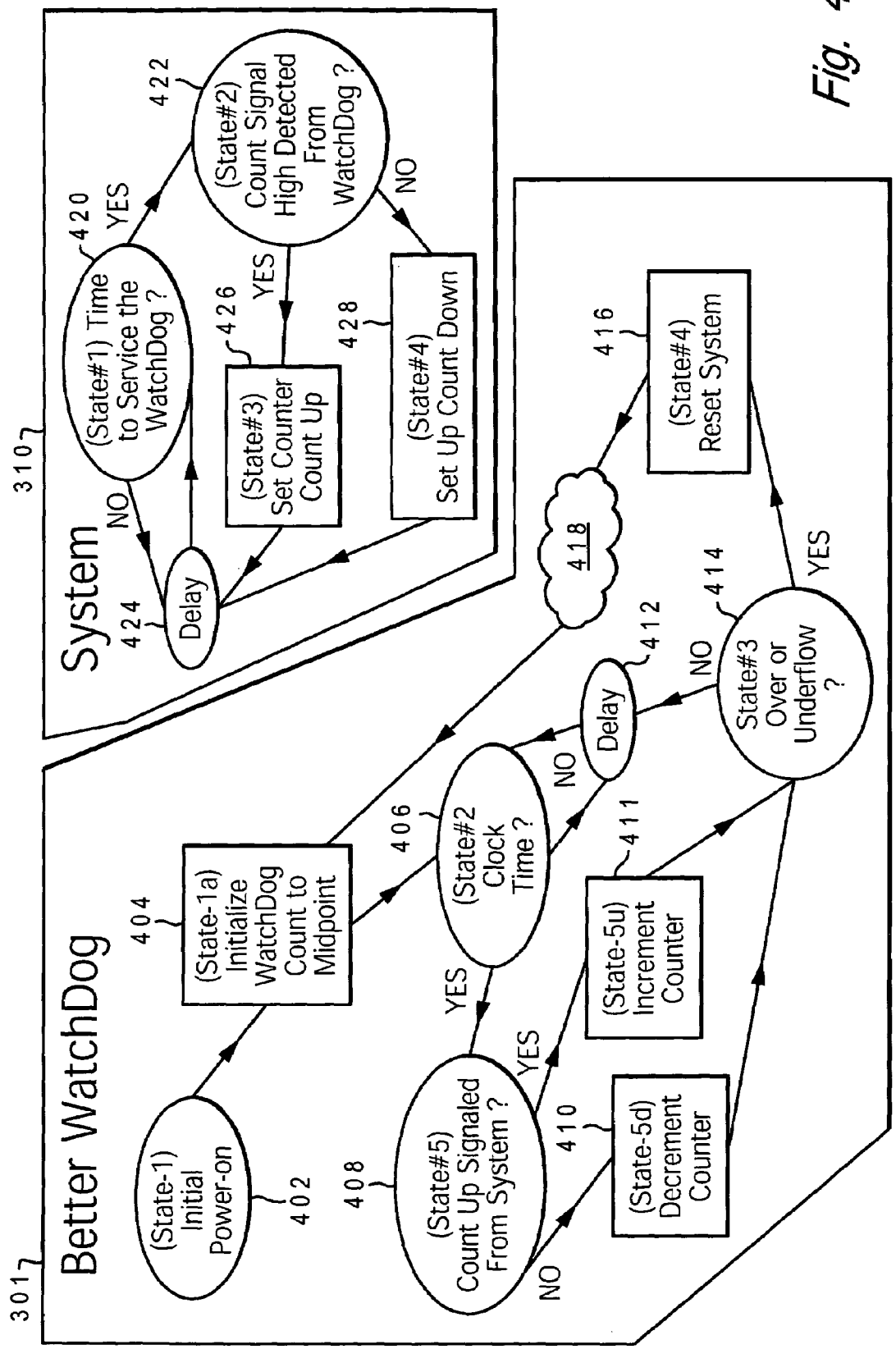
FIG. 4 is a state diagram illustrating the various transition states within the flow of operation of the intelligent watchdog circuit and system of FIG. 2, according to one embodiment of the present invention.

FIG. 4 illustrates state diagram representations of intelligent watchdog circuit 301 and host system 310. State diagram of watchdog circuit 301 includes five primary states, with two secondary states associated with state 5. The state diagram illustrates the transition from states one through five based on inputs received from system 310 and the value of the MSB, which indicates the direction in which the counter is counting (up/down). State one 402 represents the initial power on state, following which the watchdog circuit initializes the watchdog counter to midpoint (state 1a 404). Mid-point (10000000 or 01111111) is selected to provide the counter with equal range for counting up or counting down once the system is turned on.

Other embodiments may start the counter at a different point and adjust the starting direction of the count based on the starting point of the counter. For example, a counter started at zero (00000000) would necessarily have to begin counting up. State two 406 represents a decision point at which a check is made whether the clock time has changed. From state two 406, the circuit moves to either state five 408 or to a delay element 412. The delay element 412 represents a single delay loop within/associated with state two 406 that delays the eventual change to the counter until a change in the clock time occurs.

At state five 408, the circuit's logic determines whether a count up signal was received/detected from the system. When a toggle signal is detected, the circuit goes to state 5u 411 at which the watchdog counter is incremented (+1). If the signal from the system does not indicate "count up" (i.e., a "count down" signal is received), the counter is decremented at state 5d 410. From either states 5u 411 or 5d 410, control passes to state three 414 at which the circuit determines whether the counter is at an overflow or underflow state. When the counter is not at an overflow/underflow state, control is returned to state two 406 via delay element 412. When an overflow/underflow condition is registered, control passes to state four 416 at which the system is reset. The system may also perform other functions in response to the overflow/underflow condition, and these other functions are generally illustrated by block 418.

From the system perspective, four states are provided within the state diagram. The initial state, state one 420 involves a determination whether it is time to service the watchdog circuit. When the time to toggle the watchdog circuit has not arrived, control is forwarded to delay element 424, which in turn returns control to state one 420. When the time to service the watchdog circuit has arrived, control passes to state two 422 at which a determination is made whether the signal received via the MSB signal path (MSB signal 304) indicates count up. If the received signal does not indicate count up, then control passes to state four 428 at which a count down trigger/signal is provided to the counter of the watch dog circuit. However, if the received signal indicates count up, control passes to state four 426 at which a count up trigger/signal is prepared and forwarded to the counter of the watch dog circuit.

FIG. 6 is a chart which illustrates an 8-bit counter and associated features based on the value of the most significant bit. Three columns of data are represented, namely, decimal count 602, actual counter bits 604 ranging from the most significant bit to the least significant bit, and counter region 606. Within counter region 606, two main regions are differentiated, upper half of counter region 608 in which the MSB is 1 and lower half of counter region 610, in which the MSB is 0. The MSBs are indicated by bold font within actual counter bits 604. As shown by decimal count, an 8-bit counter represents 256 individual values, ranging from 0 to 255.

The chart represents an 8-bit counter with decimal range from 0-255). A watchdog event will trigger if the counter is allowed to count down through 0 (b "0000-0000") or up through 255 (b, "1111-1111"). The system objective is to keep the watchdog counting away from the closest end point (or towards the opposite region than the one it is in). Thus, if the counter is in the upper region then it will be set to count down (toward the lower region). If the counter is in the bottom or lower region then it will be set to count up. The state of the MSB clearly indicates the region of the counter and thus the desired direction of the count.

The typical watchdog function can be easily tricked by random or shucked signals. The present watchdog circuit is not easily tricked and is easy to manage and simple to implement.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A watchdog component affiliated with a host system that has a processor and a timer mechanism generating periodic clock outputs, the watchdog component comprising:

an N-bit counter that is capable of counting up to a maximum value and counting down to a minimum value, said N-bit counter having a bit that is a most significant bit (MSB);

a first output signal bus transmitting a first output signal for triggering a reset of a host system;

a second output signal bus transmitting a second output signal for signaling a value of the MSB to the host system;

a first input signal bus transmitting a first input signal that indicates whether the counter is to count up or down, said first input signal representing the received input and being generated based on the value of the MSB;

a microprocessor with processing logic having code executing thereon for performing the function of directing a count of the watchdog component away from a closest end point of the counter values towards the opposite end point of counter values, wherein a first end point is a maximum counter value and a second, opposing end point is a minimum counter value, whereby generation of false keep-alive pulses while the system is in a hung state are substantially eliminated, said code executing on the processing logic to provide:

logic for checking a state of the MSB of the counter;

logic for automatically incrementing and decrementing the value of the counter based on a periodic signal received from a periodic source;

logic for periodically determining a direction in which the counter values change (up or down) based on the value of the MSB, wherein:

when the MSB is a first value indicating the counter is closest to a zero value, said processing logic for determining selects an upwards direction for changing/increasing the counter values; and when the MSB is a second value indicating the counter is closest to a maximum value, said processing logic for determining selects a downwards direction for changing/decreasing the counter values;

logic for changing the direction of the counting by the counter from increasing to decreasing and from decreasing to increasing the value of the counter based on a received input triggered by a current value of the most significant bit (MSB) of the counter; and logic for triggering a watchdog event if the counter counts down through 0 or up through a maximum value ($2^N$);

logic for initializing the counter with an initial midpoint value during one of a power-on state and a reset state, wherein the initial midpoint value is not the maximum value or the minimum value and use of the initial midpoint value enables the counter to initially count up or count down, depending on an initial setting of the component, until a first checking of the MSB bit is completed to determine a next direction of the counter.

2. The watchdog component of Claim 1, wherein the component is implemented in hardware.

3. A controlled system comprising:
a host system that processes operations;
a watchdog circuit coupled to the host system, said watchdog circuit comprising:
an N-bit up/down counter utilized as a delay element said counter having an upper and a lower boundary, said N-bit counter having a bit that is a most significant bit (MSB);
a first output signal bus transmitting a first output signal for triggering a reset of a host system;
a second output signal bus transmitting a second output signal for signaling a value of the most significant bit (MSB) to the host system;
a first input signal bus transmitting a first input signal that indicates whether the counter is to count up or down, said first input signal representing the received input and being generated based on the value of the MSB;
a microprocessor with processing logic having code executing thereon for performing the function of directing a count of the watchdog component away from a closest end point of the counter values towards the opposite end point of counter values, wherein a first end point is a maximum counter value and a second, opposing end point is a minimum counter value, whereby generation of false keep-alive pulses while the system is in a hung state are substantially eliminated, said code executing on the processing logic to provide:
logic for checking a state of a most significant bit (M) of the counter;
logic for initializing the counter with an initial midpoint value during one of a power-on state and a reset state, wherein the initial midpoint value is not the maximum value or the minimum value and use of the initial midpoint value enables the counter to initially count up or count down, depending on an initial setting of the component, until a first checking of the MSB bit is completed to determine a next direction of the counter;
logic for registering occurrence of a watchdog event if the counter is allowed to over flow its upper boundary or under flow its lower boundary; and
logic for enabling a connected host system to keep the counter within its boundaries by controlling the direction of the count, said logic including;
logic for periodically determining a direction in which the counter values change (up or down) based on the value of the MSB, wherein:
when the MSB is a first value indicating the counter is closest to a zero value, said processing logic for determining selects an upwards direction for changing/increasing the counter values; and
when the MSB is a second value indicating the counter is closest to a maximum value, said processing logic for determining selects a downwards direction for changing/decreasing the counter values.

4. The controlled system of claim 3, wherein the watchdog circuit further comprises:
logic for monitoring a value of a most significant bit (MSB) of the up/down counter; and
logic for determining a desired count direction of the counter based on the value of the MSB, wherein:
when the MSB is a first value indicating the counter is closest to a zero value, said logic for determining selects an upwards direction for changing/increasing the counter values; and
when the MSB is a second value indicating the counter is closest to a maximum value, said logic for determining selects a downwards direction for changing/decreasing the counter values.

5. The controlled system of claim 3, wherein the watchdog circuit further comprises:
logic for automatically incrementing and decrementing the value of the counter based on a periodic signal received from a periodic source; and
logic for changing the direction of the counting by the counter from increasing to decreasing and from decreasing to increasing the value of the counter based on a received input from the host system triggered by a current value of the most significant bit (MSB) of the counter.

6. The controlled system of claim 3, the watchdog circuit further comprising:
logic for triggering a watchdog event if the counter counts down through 0 or up through a maximum value (2^N); and
logic for directing a count of the watchdog component away from a closest end point of the counter values towards the opposite end point of counter values, wherein a first end point is the maximum counter value and a second, opposing end point is 0.

7. The controlled system of claim 3, wherein the host system further comprises:
logic to control the direction of the counter's count direction, wherein the logic changes the direction to prevent both an overflow and an underflow condition rather than clear/reset the value of the counter to a start value, wherein further said logic to control the direction utilizes the value of the MSB to determine which direction substantially eliminates the occurrence of the overflow and the underflow, and said logic signals said direction to the logic controlling the counter.

8. A method within a controlled system having a host system that processes operations and a watchdog circuit coupled to the host system, said method comprising:
providing an N-bit up/down counter utilized as a delay element said counter having an upper and a lower boundary;
initializing the counter with an initial midpoint value during one of a power-on state and a reset state, wherein the initial midpoint value is not the maximum value or the minimum value and use of the initial midpoint value enables the counter to initially count up or count down, depending on an initial setting of the component;
automatically incrementing and decrementing the value of the counter based on a periodic signal received from a periodic source;
monitoring a value of a most significant bit (MSB) of the un/down counter; and
determining a desired count direction of the counter based on the value of the MSB, wherein:
when the MSB is a first value indicating the counter is closest to a zero value, said determining includes selecting an upwards direction for changing/increasing the counter values; and
when the MSB is a second value indicating the counter is closest to a maximum value, determining includes selecting a downwards direction for changing/decreasing the counter values;

controlling the direction of the counter's count direction, wherein internal logic changes the direction to prevent both an overflow and an underflow condition rather than clear/reset the value of the counter to a start value, wherein further said logic to control the direction utilizes the value of the MSB to determine which direction substantially eliminates the occurrence of the overflow and the underflow, and said logic signals said direction to the logic controlling the counter;

registering occurrence of a watchdog event if the counter is allowed to over flow its upper boundary or under flow its lower boundary; and enabling a connected host system to keep the counter within its boundaries by controlling the direction of the count.

9. The method of claim 8, further comprising:

changing the direction of the counting by the counter from increasing to decreasing and from decreasing to increasing the value of the counter based on a received input from the host system triggered by a current value of the most significant bit (MSB) of the counter.

10. The method of claim 8, further comprising:

outputting a reset of a host system when an overflow or underflow condition occurs;

transmitting a current value of the MSB to the host system; and receiving an input signal that indicates whether the counter is to count up or down, said first input signal representing the received input and being generated based on the value of the MSB.

11. The method of claim 8, further comprising:

triggering a watchdog event if the counter counts down through 0 or up through a maximum value ($2^N$); and directing a count of the watchdog component away from a closest end point of the counter values towards the opposite end point of counter values, wherein a first end point is the maximum counter value and a second, opposing end point is 0.

* * * * *